(12) United States Patent
Jokiel et al.

(10) Patent No.: US 9,033,418 B2
(45) Date of Patent: May 19, 2015

(54) FITTING FOR A VEHICLE SEAT (75) Inventors: Christian Jokiel, Heiligenhaus (DE);
Martin Stilleke, Recklinghausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 354 days.

(21) Appl. No.: 13/508,951

(22) PCT Filed: Oct. 28, 2010

(86) PCT No.: PCT/EP2010/006605
§ 371 (c)(1),
(2), (4) Date: Jul. 22, 2012

(87) PCT Pub. No.: WO2011/057720
PCT Pub. Date: May 19, 2011

(65) Prior Publication Data
US 2012/0277050 A1    Nov. 1, 2012

(30) Foreign Application Priority Data

Nov. 10, 2009 (DE) .......................... 20 2009 017 811
Mar. 22, 2010 (DE) .......................... 10 2010 012 980

(51) Int. Cl.
*B60N 2/225* (2006.01)
*F16H 1/32* (2006.01)

(52) U.S. Cl.
CPC ............ *B60N 2/2254* (2013.01); *B60N 2/2252* (2013.01)

(58) Field of Classification Search
CPC ............................. B60N 2/2252; B60N 2/2254
USPC .......................................... 297/362; 475/175
See application file for complete search history.

(56) References Cited

U.S. PATENT DOCUMENTS

| 5,871,414 | A  | * | 2/1999  | Voss et al. ...................... 475/175 |
| 7,455,361 | B2 | * | 11/2008 | Stemmer et al. ............... 297/362 |
| 8,286,777 | B2 | * | 10/2012 | Kirubaharan ............... 192/223.1 |
| 2009/0127910 | A1 | * | 5/2009 | Stilleke et al. ................. 297/362 |

FOREIGN PATENT DOCUMENTS

| CN | 1157784 A      | 8/1997  |
| CN | 1666904 A      | 9/2005  |
| CN | 102481868      | 5/2012  |
| DE | 44 11 214 C2   | 10/1995 |

(Continued)

OTHER PUBLICATIONS

International Search Report for application No. PCT/EP2010/006605 mailed Feb. 10, 2011.

(Continued)

*Primary Examiner* — David R Dunn
*Assistant Examiner* — Tania Abraham
(74) *Attorney, Agent, or Firm* — Fletcher Yoder, P.C.

(57) ABSTRACT

A fitting for a vehicle seat is disclosed, in particular for a motor vehicle seat. First and second fitting parts are geared with one another via a meshing gearwheel and gear rim. A peripheral eccentric is driven by a drive element for driving a relative rolling movement of the gearwheel and the gear rim, and the first fitting part receives the eccentric which is supported on the second fitting part. A blocking element blocks the eccentric in the non-driven state of the fitting via toothing on the first fitting part, and releases the eccentric when driven. The gear rim is formed on the first fitting part and the gearwheel is formed on the second fitting part.

12 Claims, 6 Drawing Sheets

(56) References Cited

FOREIGN PATENT DOCUMENTS

| DE | 195 48 809 C1 | 5/1997 |
| DE | 20 2009 007520 U1 | 9/2009 |
| JP | 07-279947 | 10/1995 |
| JP | 09-187337 | 7/1997 |
| JP | 2009-165647 | 7/2009 |
| WO | 2010 121758 A1 | 10/2010 |

OTHER PUBLICATIONS

Chinese Office Action mailed Mar. 31, 2014.

* cited by examiner

FITTING FOR A VEHICLE SEAT

CROSS REFERENCE TO RELATED APPLICATIONS

This application claims priority from and the benefit of PCT Application No. PCT/EP2010/006605, filed on Oct. 28, 2010; German Patent No. DE 10 2009 017 811.0, filed on Nov. 10, 2009; and German Patent DE 10 2010 012 980.1, filed on Mar. 3, 2010; all entitled "Fitting for a Vehicle Seat", which are herein incorporated by reference.

BACKGROUND

The invention relates to a fitting for a vehicle seat having the features of the preamble of claim 1.

A fitting of this type is disclosed in DE 195 48 809 C1. Not having the blocking element disclosed therein would lead to movements of the wedge segments, which in turn could lead to a relative movement of the fitting parts, so-called "deflection" under dynamic operating conditions, i.e. during travel, as a result of vibrations and impacts. The blocking element prevents deflection, on the one hand, by securing the wedge segments by means of the edges of openings formed thereon and by means of the end fingers of a spring acting on the wedge segments and, on the other hand, by cooperating with one of the fitting parts by means of latching lugs formed thereon, more specifically with the reverse side of the external toothing of the gearwheel, which otherwise does not have any other function.

SUMMARY

The object of the invention is to improve a fitting of the type mentioned in the introduction. This object is achieved according to the invention by a fitting having the features of claim 1. Advantageous embodiments form the subject matter of the sub-claims.

The configuration of the gear rim on the first fitting part receiving the eccentric and the configuration of the gearwheel on the second fitting part supporting the eccentric saves on material and constructional space, by the gearwheel being able to be formed on the radial external edge of the second fitting part (which then preferably encompasses a clip ring fastened to the first fitting part) and yet sufficiently large connecting regions are provided on the second fitting part for mounting the fitting. The gearwheel on the radial external edge of the second fitting part is then preferably encompassed by a clip ring fastened to the first fitting part. The substantially planar shape of the clip ring requires less material relative to the known configuration of L-shaped profile, resulting in weight and cost savings.

The configuration of the toothing—which is separate relative to the gear rim—on the first fitting part receiving the eccentric, allows the concept of blocking the eccentric in the non-driven state of the fitting to be adopted. When stamping the gear rim, an outwardly facing mating tooth is produced on the reverse side thereof. The configuration of the toothing separate from the gear rim and the reverse side thereof permits an adaptation of the geometries of the blocking element and the toothing which saves constructional space.

The blocking element according to the invention preferably comprises an annular shape, for example consisting of two curves, and is preferably located on a projection of a plain bearing bush, by means of which the first fitting part receives the eccentric. Corresponding spring arms ensure a non-positive connection. Optionally, guide portions may be provided said guide portions improving the mounting on the projection. An integral configuration made of spring steel permits a simple integration of the features of the blocking element. Blocking lugs which face radially outwards are preferably provided for the cooperation with the toothing of the first fitting part which is preferably configured as a gear rim with radially inwardly facing teeth. Openings through which the spring of the eccentric, which preferably consists of two wedge segments, passes are preferably provided for cooperation with the eccentric. Support fingers on which the drive element may act by means of control cams are preferably provided for cooperation with the drive element.

Relative to solutions in which the blocking element cooperates with toothings on the plain bearing bush (DE 10 2007 010 078 B4) or on a collar of the receiver lined by the plain bearing bush, in the present case there is the advantage that a larger radius of the toothing defines a larger lever arm for the blocking torque.

The blocking element primarily serves for blocking the fitting under dynamic loads. The main component of the blocking is applied by the friction between the eccentric and one of the two fitting parts, preferably the second fitting part, which preferably comprises a collar for supporting the eccentric. The wedge segments, which are preferably provided and which define the eccentric, serve both for blocking and driving the rolling movement of the gearwheel and the gear rim.

The use of an eccentric planetary gear permits a stepless inclination adjustment of the backrest. The elimination of a central pinion relative to a planetary gear system results in the production of a wobble motion which is superimposed by the relative rotation of the fitting parts. The eccentric planetary gear may be driven manually or by motor.

It is disclosed in DE 44 11 214 C2 how the plain bearing bush is incorporated in the receiver of the first fitting part. To this end, in a first step the first fitting part is fastened in a holder of a tool and the plain bearing bush is positioned on a mandrel of the tool. In a second step, by a relative movement of the mandrel and the first fitting part, the plain bearing bush is pressed into the receiver of the first fitting part. Within the context of an interference fit, the external dimension of the plain bearing bush is selected to be slightly greater than the internal dimension of the receiver of the first fitting part, so that material is displaced, said material collecting on the leading end of the plain bearing bush—relative to the movement of the mandrel—and serving as an axial securing device.

The configuration of a securing region of the plain bearing bush, said securing region acting as axial securing against displacement of the plain bearing bush in the axial direction (away from the second fitting part), wherein the securing region is formed before or after the pressing-in, has the advantage that such axial securing does not have to be provided by the pressing-in, i.e. independently of tolerances. Radial overlaps of the slightly larger plain bearing bush and the slightly smaller receiver of the first fitting part may be kept small. This reduces the force expenditure when it is pressed-in.

DRAWINGS

The invention is described in more detail hereinafter with reference to an exemplary embodiment shown in the drawings, in which.

DETAILED DESCRIPTION

Figure 6:
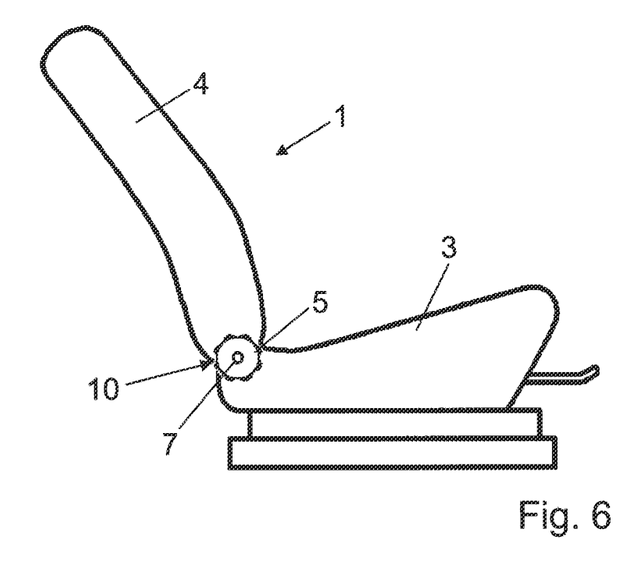
FIG. 6 shows a schematic view of a vehicle seat.

A vehicle seat 1 for a motor vehicle comprises a seat part 3 and a backrest 4 which may be adjusted in its inclination relative to the seat part 3. For the adjustment of the inclination of the backrest 4, a drive shaft 7 is rotated manually, for example by means of a handwheel 5 or by motor, for example by means of an electric motor which is arranged horizontally in the transition region between the seat part 3 and the backrest 4. On both sides of the vehicle seat 1 the drive shaft 7 engages fixedly in terms of rotation in one respective fitting 10. The drive shaft 7 defines the directional information used of a cylinder coordinate system.

Figure 1:
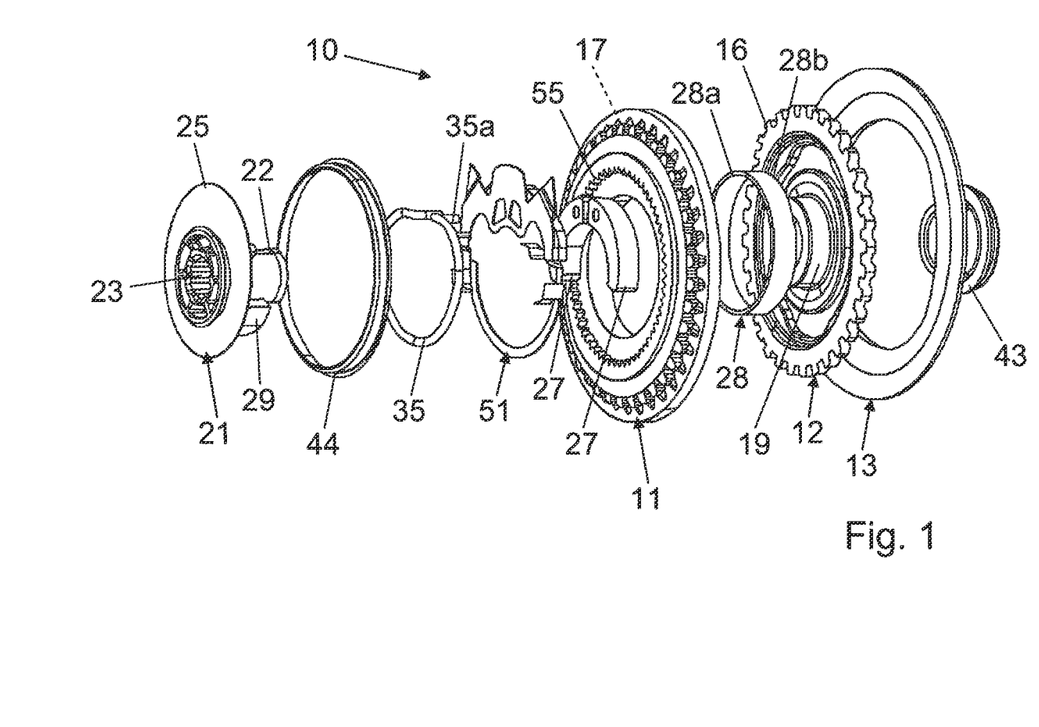
FIG. 1 shows an exploded view of the fitting.

The fitting 10 comprises a first fitting part 11 and a second fitting part 12 which may be rotated relative to one another. The two fitting parts 11 and 12 may in each case approximately describe a circular disk shape. For receiving the axially acting forces, i.e. for holding the fitting parts 11 and 12 together, a clip ring 13 is provided. Such holding together by means of a clip ring is, for example, disclosed in U.S. Pat. No. 6,799,806 A. The preferably metal clip ring 13 is fixedly connected to one of the two fitting parts 11 and 12, in the present case the first fitting part 11 in an external edge portion, for example welded or crimped. By means of a radially inwardly facing edge, the clip ring 13, optionally by the interposition of a separate sliding ring, encompasses the other of the two fitting parts 11 and 12 which is movable relative thereto, radially outwardly, without hindering the relative rotation of the two fitting parts 11 and 12. In terms of construction, therefore, the two fitting parts 11 and 12 together form a disk-shaped unit (with the clip ring 13).

When mounting the fitting 10, the first fitting part 11 is, for example, fixedly connected to the structure of the backrest 4, i.e. fixed to the backrest part. The second fitting part 12 is then fixedly connected to the structure of the seat part 3, i.e. fixed to the seat part. The association of the fitting parts 11 and 12, however, may also be transposed, i.e. the first fitting part 11 would then be fixed to the seat part and the second fitting part 12 would be fixed to the backrest. The fitting 10 is thus located in the flux of force between the backrest 4 and seat part 3, which is why the two fitting parts 11 and 12 consist of metal, preferably of steel.

The fitting 10 is configured as a geared fitting, in which the first fitting part 11 and the second fitting part 12 are connected together by means of a gear for adjusting and securing, more specifically by means of an eccentric planetary gear—in the present case a self-locking eccentric planetary gear—as disclosed for example in DE 44 36 101 A1.

For forming the gear, an externally toothed gearwheel 16 is formed on the second fitting part 12 and an internally toothed gear rim 17 is formed on the first fitting part 11 which mesh together. The diameter of the tip circle of the external toothing of the gearwheel 16 is smaller by at least one tooth height than the diameter of the root circle of the internal toothing of the gear rim 17. A corresponding difference in the number of teeth of the gearwheel 16 and the gear rim 17 of at least one tooth permits a rolling movement of the gear rim 17 on the gearwheel 16. The gearwheel 16 and gear rim 17 are preferably formed by means of a single punching-stamping process which stamps out the fitting parts 11 and 12 at the same time from their initial material. In the present case, the gearwheel 16 forms the radial external edge of the second fitting part 12, i.e. the second fitting part 12 is terminated radially outwardly by the gearwheel 16.

One of the two fitting parts 11 and 12 comprises a collar 19, in the present case the second fitting part 12 concentrically to the gearwheel 16. The collar 19 may be integrally formed (i.e. formed in one piece) as a collar extension on said fitting part or fastened thereto as a separate sleeve. In the collar 19, a drive element 21 is rotatably mounted by means of a hub 22. The drive element 21 preferably consists of plastics. The hub 22 of the drive element 21 is provided centrally with a bore 23 for receiving the drive shaft 7. The profile of the bore 23 is configured to match the profile of the drive shaft 7, in the present case a splined shaft profile. The drive element 21 comprises adjacent to its hub 22 a cover plate 25 which is formed integrally with the hub 22 and has a larger diameter than the hub 22.

Two wedge segments 27—with their curved internal surfaces—are supported on the collar 19, said wedge segments—with their curved external surfaces—supporting the other of the two fitting parts 11 and 12, in the present case the first fitting part 11. To this end, a receiver of the last-mentioned fitting part is lined by a plain bearing bush 28 which is pressed-in and preferably fixed in terms of rotation, and against which the external surfaces of the wedge segments 27 bear. The terms "support" and "bear" are not intended to be limited to a specific direction of the flux of force through the fitting 10, as this direction depends on the mounting of the fitting 10.

Figure 2:
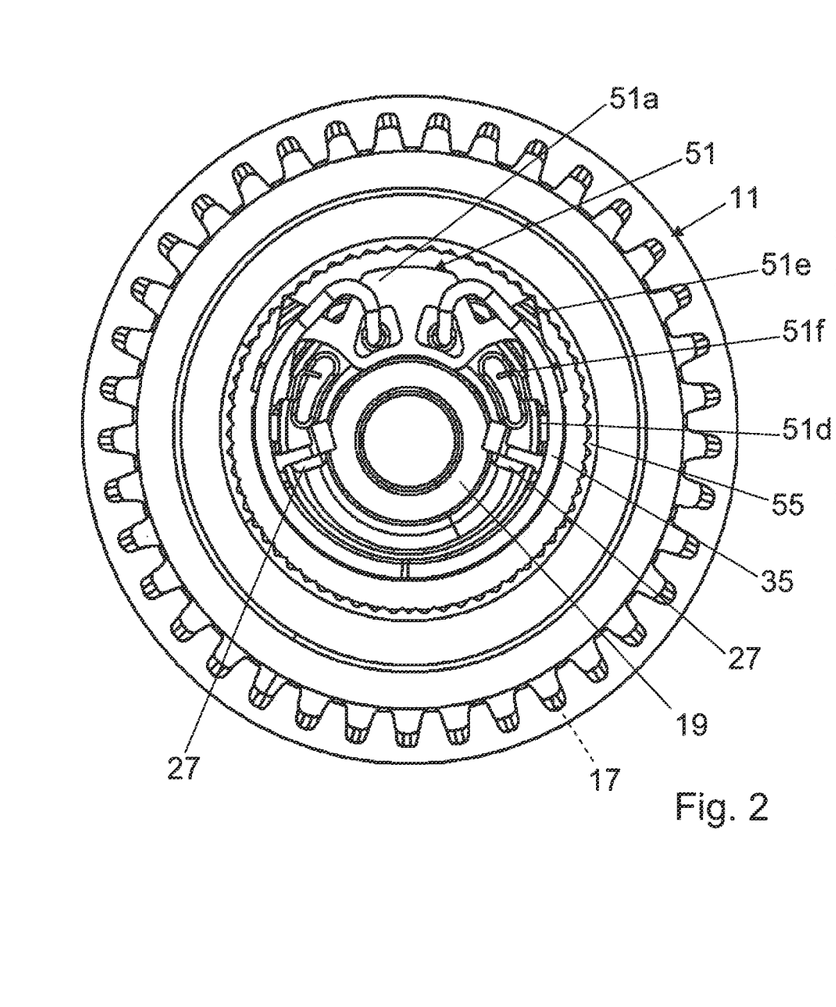
FIG. 2 shows a partial view of the fitting without a drive element.
Figure 3:
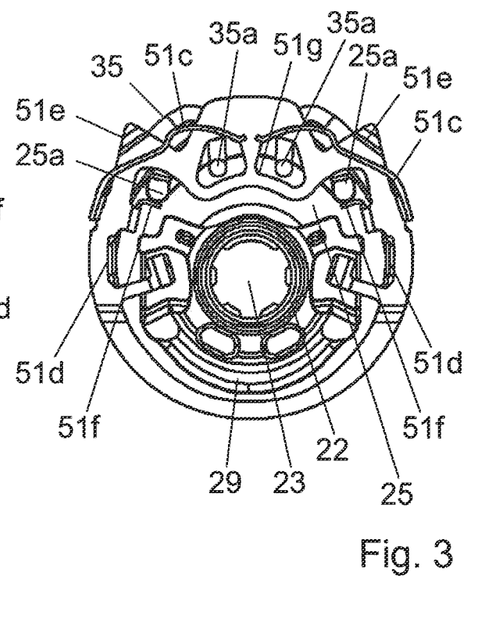
FIG. 3 shows a view of the drive element, spring and blocking element from the opposing direction to FIG. 2.

The drive element 21 comprises—radially spaced apart from the hub 22—a drive element segment 29 gripped with clearance between the narrow sides of the wedge segments 27, said drive element segment being configured integrally with the cover plate 25 and with the hub 22. The wedge segments 27, the broad sides thereof facing one another, receive in each case an angled end finger 35a of an omega-shaped spring 35, for example by means of one respective recess defined by projecting material portions. The spring 35 acts on the wedge segments 27 in the peripheral direction, in particular in order to force them apart, wherein during operation the broad sides of the wedge segments 27 are able to come into contact with one another and act on one another.

The drive element 21 is axially secured on the outside of the fitting part comprising the collar 19, by a securing ring 43 which is preferably clipped on. A sealing ring 44 is provided on the outside of the fitting part comprising the plain bearing bush 28 (in the present case the first fitting part 11) between the radial external edge thereof and the cover plate 25, said sealing ring being made of rubber or flexible plastics, for example, and being connected to the cover plate 25, in particular being clipped-on.

An eccentric is defined by the wedge segments 27 (and the spring 35), said eccentric pressing the gearwheel 16 into the gear rim 17 at an engagement point in the extension of the direction of the eccentricity. When driven by the drive shaft 7 rotating (repeatedly), a torque is initially transmitted to the drive element 21 and by means of the drive element segment 29 onto the eccentric thus defined, said eccentric sliding along the plain bearing bush 28, extending the direction of the eccentricity and thus displacing the engagement point of the gearwheel 16 in the gear rim 17, which constitutes a wobbling rolling motion, i.e. a relative rotation with a superimposed wobble motion. As a result, the inclination of the backrest 4 is able to be steplessly adjusted between a plurality of positions of use.

For improving the dynamic operating behavior, a blocking spring 51 is also provided as a blocking element, as is disclosed, for example, in DE 195 48 809 C1. The blocking spring 51 in the present case is formed in one piece from spring steel.

Figure 5:
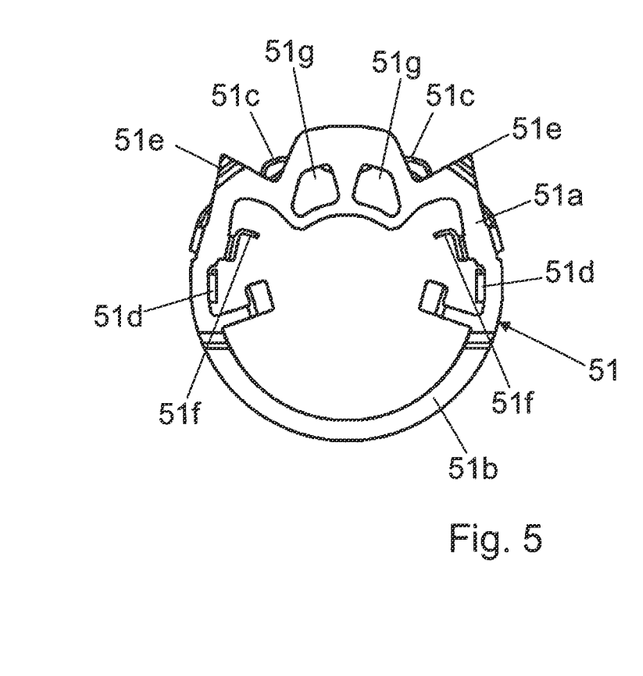
FIG. 5 shows a view of the blocking element.

The substantially annular blocking spring 51 comprises a base curve 51a which is arranged in a plane parallel to the first fitting part 11, and a bearing curve 51b, which is arranged in a plane offset relative to the base curve 51a, and on both sides is adjacent to the base curve 51a in each case by means of an angled portion, forming the annular shape. Two spring arms 51c face one another with their free ends and are integrally formed on the base curve 51a with the ends remote from one another. Whilst the base curve 51a and the bearing curve 51b are largely located within said two planes in the peripheral and radial directions, the two spring arms 51c extend in the axial direction between said two planes. Bent-back, cylindrically curved guide portions 51d optionally protrude from the base curve 51a, said guide portions also extending in the axial direction between said two planes. Finally, the blocking spring 51 comprises two blocking lugs 51e, which protrude from the base curve 51a radially (outwards), two support fingers 51f, which protrude axially from the base curve 51a (or alternatively from the bearing curve 51b) and two openings 51g which are formed in the base curve 51a.

Figure 4:
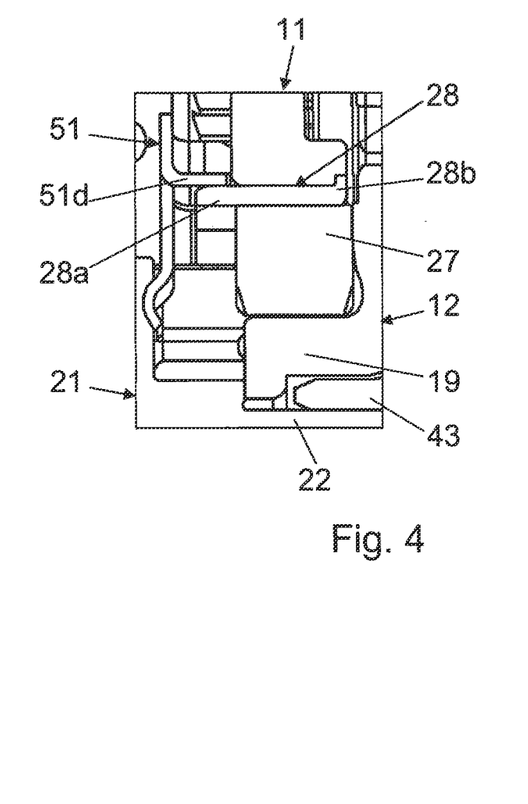
FIG. 4 shows a partial section through the fitting.

The plain bearing bush 28 in the present case has a larger axial dimension than the receiver lined by said plain bearing bush, so that it protrudes in the axial direction over the fitting part associated therewith, i.e. in the present case the first fitting part 11, which defines a projection 28a. The blocking spring 51 is supported on the projection 28a of the plain bearing bush 28, on the one hand, by the bearing curve 51b and, if present, the guide portions 51d bearing against the projection 28a of the plain bearing bush 28 and, on the other hand, on the side radially opposing the bearing curve 51b, the spring arms 51c being tensioned against the projection 28a of the plain bearing bush 28. The end fingers 35a of the springs 35 penetrate the openings 51g.

The blocking spring 51 cooperates with a toothing 55 on the first fitting part 11 arranged concentrically to the plain bearing bush 28 and radially outside thereof, the teeth thereof facing radially inwardly, i.e. said toothing being configured as a further gear rim, in the present case on the reverse side of the gear rim 17 and concentrically thereto. The blocking spring 51 blocks the wedge segments 27 in the non-driven state of the fitting 10, by the blocking lugs being in engagement with the toothing 55. A movement of the wedge segments 27 is hindered by the bearing of the end fingers 35a of the spring 35 on the edges of the respective openings 51g. As the openings 51g are larger than the cross section of the end fingers 35a, the bearing only takes place after a slight movement—depending on tolerances—of at least one of the wedge segments 27, i.e. after a slight rotation of the eccentric.

The blocking spring 51 is released by the driven drive element 21, by said drive element being configured by means of a control cam 25a, which is preferably formed on the cover plate 25, coming to bear on one of the support fingers 51f, wherein for each rotational direction a control cam 25a and a support finger 51f are provided in each case. When the drive element 21 acts on the support finger 51f, it starts to pull the blocking lugs 51e out of the toothing 55 and namely radially inwards. The blocking spring 51 which is rotatably mounted on the plain bearing bush 28 then rotates with the drive element 21. The edges of the openings 51g remote from one another extend obliquely to the radial direction. As soon as the trailing end finger 35a reaches the trailing oblique edge of the associated opening 51g, the region of the blocking spring 51 together with the blocking lugs 51e, i.e. the base curve 51a, moves radially further inwards. The blocking lugs 51e and the toothing 55 then come completely out of engagement. At the same time or afterwards, the drive element segment 29 comes to bear on the trailing wedge segment of the two wedge segments 27, whereupon the eccentric starts to rotate (circulate). If the drive element 21 is stopped, the spring arms 51c bring the blocking lugs 51e again into engagement with the toothing 55, so that the wedge segments 27 are blocked again.

Figure 7:
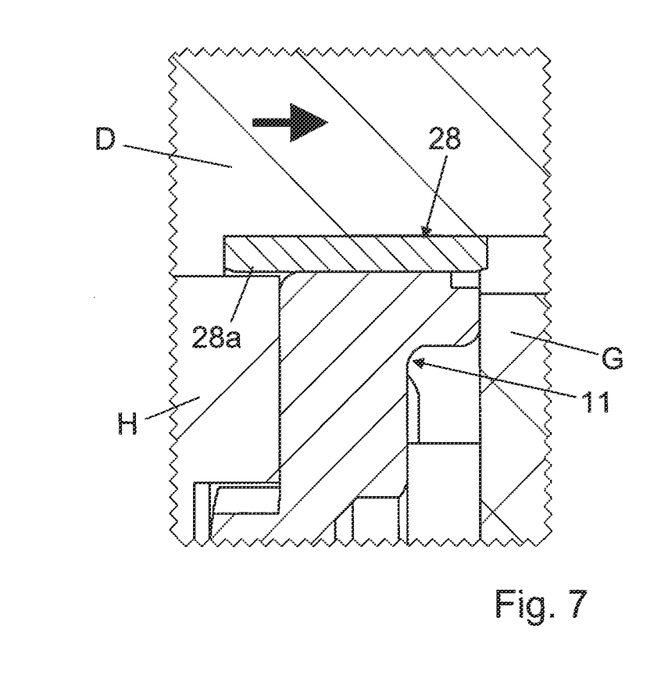
FIG. 7 shows a partial section with a plain bearing bush pressed-in before its securing region is formed.

The plain bearing bush 28 comprises, at the end remote from the projection 28a, a radially protruding securing region 28b which acts as axial securing against displacement of the plain bearing bush 28 in the axial direction away from the second fitting part 12. In the axial direction towards the second fitting part 12 the second fitting part acts as axial securing against displacement of the plain bearing bush 28. For inserting the plain bearing bush 28 into the receiver of the first fitting part 11, in a first step the first fitting part 11 is placed on a holder H of a tool and precentered, and the plain bearing bush 28 is placed on a mandrel D of the tool. In a second step, by a relative movement of the mandrel D and the holder H (receiving the first fitting part 11) the plain bearing bush 28 is pressed into the receiver of the first fitting part. The external dimension of the plain bearing bush 28, within the context of an interference fit, is selected to be the same or preferably slightly larger than the internal dimension of the receiver of the first fitting part 11 (for tolerance compensation) so that said interference fit assists the axial securing. The material of the first fitting part 11, due to a previously carried-out hardening process, is preferably harder than the material of the plain bearing bush 28. Potentially excess material which is displaced due to the differences in dimensions when pressed-in, collects at the trailing end of the plain bearing bush 28—relative to the movement of the mandrel D.

Figure 8:
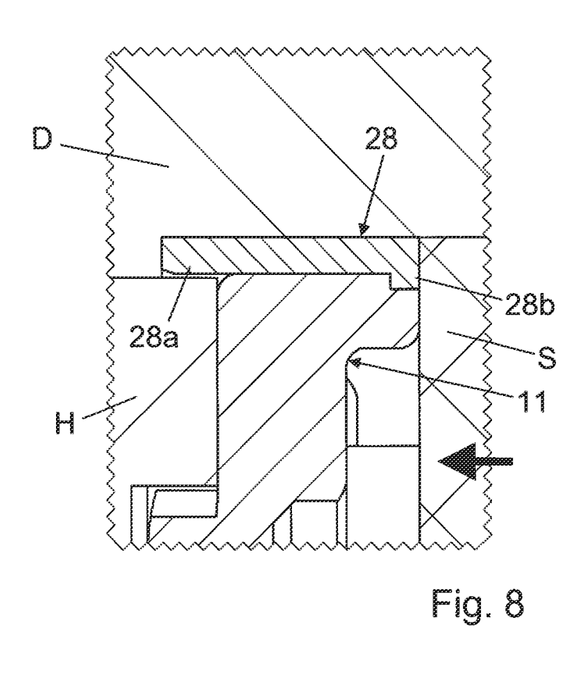
FIG. 8 shows the partial section of FIG. 7 after the formation of the securing region which is arranged in a recess of the first fitting part.
Figure 9:
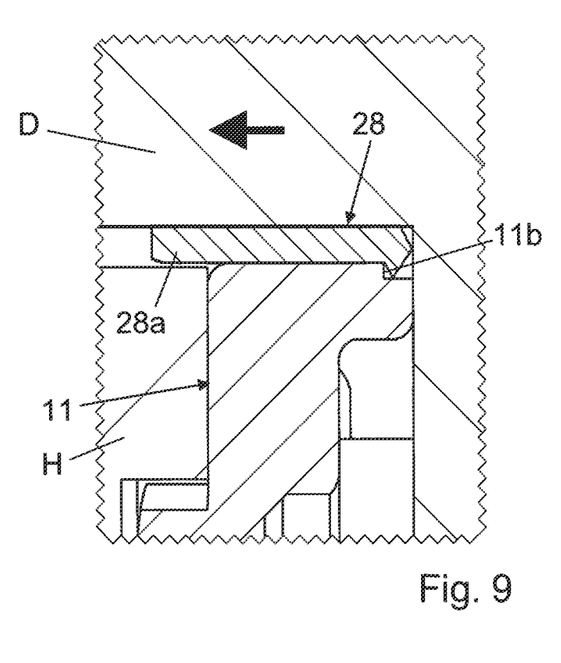
FIG. 9 shows a partial section with a plain bearing bush, the securing region thereof being preformed.
Figure 10:
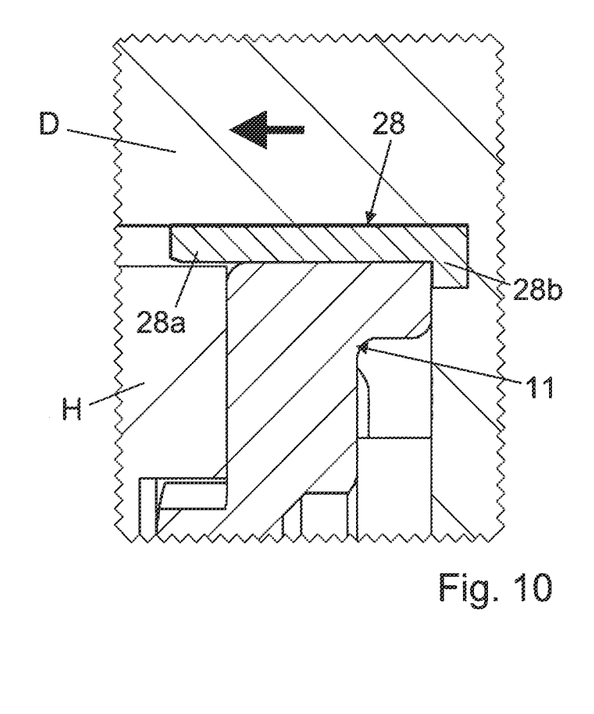
FIG. 10 shows a partial section with a plain bearing bush, the securing region thereof bearing on a front face of the first fitting part.

Several possibilities exist in order to produce the securing region 28b. In this case, the securing region 28b which is produced may be arranged in an annular recess 11b of the first fitting part 11 around the receiver for the plain bearing bush 28 (FIGS. 8, 9) or it may bear, i.e. axially protrude, on the front face of the first fitting part 11 (FIG. 10).

The securing region 28b may be formed on the leading end of the plain bearing bush 28—relative to the movement of the mandrel D. To this end, in the above-mentioned first step the first fitting part 11 is clamped between the holder H and a counterholder G. The plain bearing bush 28 in the above-mentioned second step is pressed-in sufficiently far that the projection 28a is produced on the trailing end and a further projection is produced on the leading end (FIG. 7). The material of said further projection is then reshaped in a third step, by being forced radially outwards, for example by means of a punch S which is provided instead of the counterholder G and is moved relative to the mandrel D, whilst the holder H and the mandrel D remain immobile relative to one another. The securing region 28b is produced (FIG. 8) by the reshaping process.

Alternatively, the securing region 28b may be formed on the trailing end of the plain bearing bush 28—relative to the movement of the mandrel D. In this case, two variants are possible. In one variant, not shown, the securing region 28b is retrospectively formed. The plain bearing bush 28 in the above-mentioned second step is pressed-in sufficiently far that a further projection is produced on the leading end of the projection 28a and on the trailing end. The material of this further projection is then reshaped in a third step, by being forced radially outwards, for example by means of a punch, an impact, wobble riveting or the like, so that the securing region 28b is produced.

In the other variant (FIGS. 9, 10) the securing region 28b is already preformed or fully formed on the plain bearing bush 28 before being pressed-in. Relative to the holder H, the mandrel D moves in the opposing direction to FIG. 7. Insofar as the securing region 28b is only preformed before being pressed-in, the plain bearing bush 28 in the second step is pressed-in until the projection 28a is produced on the leading end and a further projection is produced on the trailing end (FIG. 9), at least relative to the annular recess 11b. In the third step the material of the preformed securing region 28b is reshaped, for example by means of a punch until said securing region is fully formed, i.e. radially protrudes in the manner of a collar. The annular recess 11b may serve as a counter punch. Insofar as the securing region 28b is already fully formed before being pressed-in, for example as a (radially protruding) collar, in the second step the plain bearing bush 28 is pressed-in until the projection 28a is produced on the leading end and on the trailing end the securing region 28b reaches its end position, i.e. comes to rest in the annular recess 11b (end position of the plain bearing bush 28 as in FIG. 8) or bears against the front face of the first fitting part 11 (FIG. 10).

The invention claimed is:

1. A fitting for a motor vehicle seat, comprising:
   a first fitting part comprising a gear rim having a first set of internal teeth and a toothing having a second set of internal teeth, wherein the toothing is positioned radially inward from the gear rim;
   a second fitting part comprising a gearwheel having a first set of external teeth, wherein the gearwheel is configured to engage the gear rim of the first fitting part;
   a peripheral eccentric driven by a drive element and configured to drive a relative rolling movement of the gearwheel and the gear rim, wherein the first fitting part receives the eccentric which is supported on the second fitting part; and
   a blocking element which blocks the eccentric in the non-driven state of the fitting by cooperation with the toothing, wherein the blocking element releases the eccentric when driven by the drive element.

2. The fitting of claim 1, wherein the toothing is formed on an axial side of the first fitting part opposite the gear rim.

3. The fitting of claim 1, wherein the toothing is formed concentrically to the gear rim.

4. The fitting of claim 3, wherein the toothing is formed on an axial side of the first fitting part opposite the gear rim.

5. The fitting of claim 1, wherein the blocking element comprises at least one blocking lug protruding radially outwards.

6. The fitting of claim 1, wherein the eccentric comprises two wedge segments acted upon by a spring, and the blocking element comprises at least one opening penetrated by the spring, and wherein the blocking element blocks the eccentric by the spring bearing against an edge of the at least one opening.

7. The fitting of claim 6, wherein the blocking element blocks the eccentric by the spring bearing against an edge of the at least one opening after a slight rotation of the eccentric.

8. The fitting of claim 1, wherein the drive element comprises at least one control cam which, when the drive element is driven, cooperates with a support finger of the blocking element and releases the blocking element from the toothing.

9. The fitting of claim 1, wherein the first fitting part receives the eccentric via a plain bearing bush concentric to the gear rim, the plain bearing bush protruding with a projection axially over a receiver of the first fitting part lined by the plain bearing bush.

10. The fitting of claim 9, wherein the blocking element is supported on the projection of the plain bearing bush by a bearing curve, at least one guide portion, at least one spring arm, or a combination thereof.

11. The fitting of claim 1, wherein a clip ring holds the first fitting part and the second fitting part axially together, forming a disk-shaped unit.

12. A vehicle seat comprising at least one fitting as claimed in claim 1, wherein a seat part is connected to one of the two fitting parts and a backrest which is connected to the other of the two fitting parts.

* * * * *